United States Patent [19]
Toulmay et al.

[11] Patent Number: 6,000,911
[45] Date of Patent: Dec. 14, 1999

[54] BLADE WITH SWEPT-BACK TIP FOR THE ROTARY WINGS OF AN AIRCRAFT

[75] Inventors: François Valentin Gaston Toulmay, Vitrolles; Joëlle Marguerite Zibi, Paris, both of France

[73] Assignees: Eurocopter, Marignane Cedex; Onera, Chatillon, both of France

[21] Appl. No.: 08/972,274

[22] Filed: Nov. 18, 1997

[30] Foreign Application Priority Data

Nov. 19, 1996 [FR] France .................................... 96 14066

[51] Int. Cl.⁶ .................................................... B46C 11/18
[52] U.S. Cl. ..................... 416/223 R; 416/228; 416/238; 416/DIG. 5
[58] Field of Search ............................ 416/228 R, 228 A, 416/237, 238, 223 R, DIG. 2, DIG. 5

[56] References Cited

U.S. PATENT DOCUMENTS

| | | | |
|---|---|---|---|
| 3,066,742 | 12/1962 | Castles, Jr. ............................... | 170/159 |
| 4,130,377 | 12/1978 | Blackwell, Jr. .......................... | 416/228 |
| 4,880,355 | 11/1989 | Vuillet et al. ............................. | 416/228 |
| 5,035,577 | 7/1991 | Damongeot .......................... | 416/223 R |
| 5,332,362 | 7/1994 | Toulmay et al. ..................... | 416/223 R |

FOREIGN PATENT DOCUMENTS

| | | |
|---|---|---|
| 2 617 118 | 12/1988 | France . |
| 2 636 593 | 3/1990 | France . |
| 2 689 852 | 10/1993 | France . |

OTHER PUBLICATIONS

French Search Report dated Jun. 23, 1997, 3 pages.

*Primary Examiner*—F. Daniel Lopez
*Assistant Examiner*—Richard Woo
*Attorney, Agent, or Firm*—Marshall, O'Toole, Gerstein, Murray & Borun

[57] ABSTRACT

The present invention relates to a blade with a swept-back tip for a rotary wings of an aircraft, a blade being formed of successive elemental cross sections. The blade is divided into different regions, with the chord length L and the offset y'f of the center of pressure from the pitch-change axis and the relative thickness of each elemental section are optimized for high-speed flight. The first region has a linearly increasing chord length, the second region has the maximum and constant chord length, the third region has a linearly decreasing chord length and the fourth region has a decreasing chord length according to a parabolic function. The offset of the aerodynamic center is positive and increases in proportional to the distance in the first region, is at its maximum and constant in the second region, and decreases linearly and become negative in the third region.

10 Claims, 5 Drawing Sheets

BLADE WITH SWEPT-BACK TIP FOR THE ROTARY WINGS OF AN AIRCRAFT

The present invention relates to a blade for the rotary wings of an aircraft, with a swept-back tip, optimized for high-speed flight.

It is known that both in hovering flight and in forward flight, the performance of a rotary-wing aircraft rotor, especially a helicopter rotor, is limited by the following phenomena:

the shockwaves which develop on the suction face and pressure face of the advancing blades during high-speed flight;

the stalling that results from the detachment of the boundary layer on the suction face of the retreating blades when there is a demand for lift in translational flight;

the interaction of the vortex generated by the previous blade with the following blade, which leads to a substantial dissipation of energy in two forms: induced power and drag on the profiles, in hovering flight.

In addition to being responsible for drops in performance, the shocks and the blade-vortex interaction are also responsible for acoustic problems in the form of pulsating noises caused by shock delocalization (high-speed flight) or by pulsating changes in lift when the marginal vortex directly strikes the blade (descent).

It has been found that the performance of a blade for the rotary wings of an aircraft depends, to a large extent, on parameters associated with the construction of the blade, such as:

a) the radial distribution of blade area;
b) the back sweep of the blade tip;
c) the change in relative thickness of the profiles;
d) the distribution of the twist of the profiles;
e) the blade tip droop.

The influence that these parameters have on the performance of a rotary-wing blade is set out in detail below.

a) Radial distribution of blade area

For the rotor of a rotary-wing aircraft whose elemental sections or profiles all work with the same coefficient of lift Cz, the linear lift varies as the local chord length L(r) and as the square of the local speed, which is directly proportional to the radius (radial position) r of the section. This means that the total lift of the blade varies in proportion with the mean chord $\overline{L}$ defined by a square-law weighting of the radius r:

$$\overline{L} = \frac{\int_{RO}^{R} L(r) r^2 \, dr}{\int_{RO}^{R} r^2 \, dr}$$

in which RO represents the radius r at the start of the blade section at the root end of the blade, and R the total radius of the blade.

It is common practice for the performance of different shapes of blades to be compared on the basis of this mean chord $\overline{L}$.

Compared with a conventional blade of rectangular shape, calculations have shown and experience has confirmed that reducing the chord at the outboard end of the blade (tapered shape) improves performance, particularly at high speed. This improvement in performance is achieved by the reduction in drag of the profiles due to the reduction in chord at the tip. Shocks in this region are exerted on a smaller area, while the central part of the blade which is not subjected to the shocks gives most of the lift with a maximum aerodynamic efficiency: the lift/drag ratio here is at a maximum.

The increase in chord along the rest of the length of the blade, needed to keep the mean chord constant, is however considerable because of the $r^2$ weighting. This then makes the rotor considerably heavier. Nonetheless, tapering the blade toward the tip is a means commonly used to improve blade performance, generally combined with the blade tip being swept back, as illustrated in patents FR-2 617 118 and FR-2 473 983.

Another source, patent FR-2 311 713, proposes a very different construction which, among other particular features, consists in broadening the chord sharply beyond a section situated at approximately 87% of the total radius of the blade R. This arrangement contributes to the appearance of intense and stable vortices which push back the stall limit, particularly when the blade is retreating. However, this concept, which concentrates the blade area toward its tip, amounts to reducing the effective part of the rotor to a peripheral ring. This makes the induced flow less uniform and the induced power therefore increases, something which is a particular problem for taking off.

The sharp variations in chord and the associated drawbacks are avoided with the blade design that forms the subject of patent FR-2 689 852 in the name of the Applicant Company. In this design, the region with longest chord is still close to the tip, again with the purpose of increasing the lift capabilities. However, this design is not ideal for high-speed flight with medium lift because, in these conditions, the sections with a long chord, close to the tip, suffer from increased drag because of compressibility phenomena, while the region with the greatest aerodynamic efficiency (lift/drag ratio) is further from the tip. Too small a proportion of the area of the blade is making use of this central region of the blade where the aerodynamic efficiency is at its maximum.

b) Sweeping back the blade tip

In addition, in order to push back the threshold at which shockwaves appear and to limit their intensity, it is advantageous for the blade tip to be curved backward. The sweep angle Λ defined by the line of centers of pressure (in about the front quarter of the chord) and the pitch-change axis reduces the effective Mach number and thus sweeping back the blade tip constitutes an effective means of reducing the unfavorable consequences of the compressibility of air, especially the appearance of shockwaves.

A swept-back blade tip of this kind is illustrated in particular in patents FR-2 311 713, FR-2 473 983 and FR-2 617 118, and is actually used on some helicopters.

However, the size of the sweep angle and the amount of the blade span that the tip in question can occupy are in fact limited by the torsional forces which result from the aerodynamic lift and the center of gravity being offset rearward.

Patent FR-2 311 713 proposes to offset part of the blade forward so as to balance the rearward offset of its tip. This makes it possible to extend the swept-back region to a larger part of the blade span. However, the join between the forwardly-offset leading edge portion and the inboard part of the blade is abrupt and the vortex that this join generates causes premature stalling of the profiles closest to the rotor hub. At high speed, the concave shape of the leading edge at the join focuses and locally strengthens the shockwaves with the risk of reducing or even nullifying the beneficial effects of the swept-back tip.

Patent FR-2 397 328 also recommends that the leading edge be offset forward, but this is for a different reason. Here, it is not a question of reducing the torsional forces, but of causing elastic deformation of the blade in a controlled way which is deemed to be favorable.

However, the effect of the sweep angle may become unfavorable at high speed if this angle exceeds a value of about 45°. If the angle is too large, the air flows practically parallel to the leading edge when the blade is retreating and in the rear sector of the rotor disk during high-speed translational flight: this temporarily reduces the aerodynamic lift of the tip and increases its drag, hence resulting in an overall drop in efficiency. The swept-back blade that is the subject of patent FR-2 689 852 may in particular suffer from this problem.

c) Change in relative thickness of profiles

The relative thickness of a blade cross section is defined as being the ratio of the absolute thickness to the chord length of the profile that constitutes the contour of this section, i.e. e/L.

Conventional blades, which have a constant chord length over most of the length of their span, generally employ, at the blade root end, profiles that have a relative thickness of between 10 and 14%, which gives them sufficient torsional rigidity but does not give them good enough performance at high speed.

In patent FR-2 689 852 for example, reducing the chord near the blade root is likely to improve the high-speed performance because the aerodynamic efficiency is not good at the blade root on account of the very great variations in aerodynamic incidence and the attack from the trailing edge suffered by profiles inside the region known as the "reverse-flow circle". However, reducing the chord dangerously reduces the rigidity of the blade, and the torsional deformations, exacerbated also by offsetting the tip from the pitch-change axis, assume an amplitude which is so great that performance diminishes or alternatively is not improved as much as it might be desired.

d) Distribution of twist of profiles

In addition to the radial distribution of chord length and the sweeping back of the blade tips, the distribution of the twist of the elemental sections of a blade also plays a part in improving the performance of this blade. The blade twist consists in varying the angle at which the profiles are set along the span of the blade, in such a way that the outboard end or tip of the blade attacks the air at a relatively low angle of incidence, and the blade root attacks the air at a higher angle of incidence. This makes it possible to distribute the lift more uniformly over the entire rotor area and thus the absorbed power in hovering flight.

The twist is therefore characterized by the difference in angular setting between the two ends of the blade. However, it is known that a high degree of twisting may cause the outboard end of the blade to produce negative (downward) lift when the blade is advancing when the rotary-wing aircraft is traveling at high speed. Performance is thus degraded and, what is more, vibration increases considerably.

The choice of twist is therefore a compromise between on the one hand, hovering flight and low speeds which require a high degree of twisting and, on the other hand, forward flight for which a more modest amount of twisting is desirable.

For simplicity, the radial distribution of the twist is often linear, which means that the total twist is all that is required to define the angular setting of all the elemental sections.

Nonetheless, to improve performance, patent FR-2 636 593 proposes a non-linear twist which consists in giving the outboard end of the blade, for example between 85 and 100% of the total radius of the blade R, an extra amount of twist. This has the effect of reducing the strength of the marginal vortex, or even of canceling it, for a given amount of lift, so that the low-speed performance is improved and the noises of blade/vortex interactions during descent are attenuated. However, this arrangement does not make it possible to push back the limits of stalling, and the power savings decrease at high speed.

Patent FR-2 689 852 proposes a radical increase in the amount of twist in a central region lying approximately between 45 and 80% of the span. A modification of this kind, which is aimed at improving the lift capability, would not be optimal for a rotor whose objective was to increase the efficiency at high speed.

e) Blade tip droop angle

Conventionally, blades are constructed in such a way that the center of pressure of the profiles, generally defined as being the point at mid-thickness in the front quarter of the chord, remains more or less on the pitch-change axis, and does so along the entire length of the span. Furthermore, sweeping back the blade tip is generally achieved by shifting the center of pressure in the plane defined, on the one hand, by the pitch-change axis and, on the other hand, by the direction of the chord of the profile in the tip region.

Described in patent FR-2 617 118 is an improvement to this conventional construction, which consists in making the line of centers of pressure lie in a plane that passes through the pitch-change axis, but at an angle to the chord, so that the centers of pressure of the profiles at the blade tip are appreciably lower than the inboard part of the blade. The marginal vortex generated by the outboard end of one blade is thus further from the following blade, the result of this being that it reduces the strength of the interaction, particularly in hovering flight. This leads to a clear reduction in the power absorbed by the rotor, especially in hovering and low-speed flight.

This approach is denoted by the term "mise en dièdre [drooping]" of the blade tip even though, in patent FR-2 617 118, the center of pressure is shifted progressively (in a parabolic way) rather than there being a simple "break" as also in patent FR-2 689 852.

It can thus be seen that none of the above documents describes a blade structure which is entirely free of drawbacks, and in this context the present invention relates to a blade for rotary wings, with a swept-back tip, the geometry of which is designed to be optimal for guaranteeing the best performance, especially for high-speed flight.

To this end, the blade with a swept-back tip for the rotary wings of an aircraft, which blade is intended to form part of a rotor whose hub is connected to said blade, which can be rotated about the axis of said hub, said blade having a leading edge and a trailing edge, and being formed of successive elemental cross sections identified by the distance r separating each of them from the axis of rotation of the said hub and each having a defined chord profile and a center of pressure whose offset from the pitch-change axis, orthogonal to each of said sections, determines the sweep of said blade, is noteworthy, according to the invention, in that, subdividing said blade along its longitudinal length into four regions, namely a first region extending from the inboard edge of the blade to a first section situated at approxiamtely 66% of the distance along the total length of the blade, measured from the axis of rotation of the hub, a second region extending from the first section to a second section situated at approximately 85% of the distance along the total length of the blade, a third region extending from the second section to a third section situated between 93% and 97% of the distance along the total length of the blade, and a fourth region extending from the third section to the free outboard edge of the blade, the chord length L increases in a more or less linear manner in said first region, is at its maximum and constant in said second region, decreases linearly in said third region, and decreases according to a parabolic function in said fourth region, satisfying the conditions of continuity of the rate of chord variation at the boundary where this region meets the third region, and the offset Y'f of the center of pressure from the pitch-change axis in said first region is positive and increases in proportion to the distance r, is at its maximum and constant in said second region, decreases linearly and becomes negative in said third region, so that the sweep angle $\Lambda$ keeps a constant value approximately equal to 25° backward, and decreases according to a parabolic function in said fourth region, satisfying the condition of continuity of the sweep angle $\Lambda$ at the boundary where this regions meets the third region until it reaches its lowest negative value at the tip.

Thus the geometry, as defined, of the blade makes it possible to guarantee the best performance for a rotary-wing aircraft, especially a helicopter, in which lift is provided by a rotary wing consisting of such blades, flying at a high cruising speed of between 315 and 350 km/h for example, with a modest amount of lift exhibiting a mean lift coefficient for the profiles Czm of between 0.3 and 0.5.

More specifically, the fact that according to the invention the place along the span of the blade where the chord is at its maximum is shifted close to the middle of the span makes it possible to obtain a higher speed capability, as does the resulting longer length of the region in which the chord decreases toward the tip. This new arrangement also makes it possible to shorten the region in which the chord is reduced toward the blade root, which leads to structural stiffening which limits the undesirable torsional deformation.

Furthermore, remembering that the center of pressure is defined here as being the point on each section situated in the front quarter between the leading edge and the trailing edge, the offset Y'f is the distance, in the direction of the chord, between the pitch-change axis and the center of pressure, taken as being positive when the shift in section takes place toward the leading edge. The sweep angle $\Lambda$ is defined as being the angle between the tangent to the curve joining the centers of pressure of the sections and the pitch-change axis, viewed from above. The sweep is directed backward at the blade tip. The angle $\Lambda$ can be deduced directly from the law governing changes in Y'f:

$$\Lambda\ (r) = \arctan\ (dY'f/dr).$$

The beneficial effect of the sweep angle, reducing the strength of the shocks, is obtained to the full for values of sweep angle $\Lambda$ of between 30° and 45°, the maximum value of 45° being reached only at the very tip of the blade. The invention makes it possible to limit the angle $\Lambda$ to a maximum value of 45° at the tip thanks to the very gradual decrease in chord, combined with a trailing edge which is straight along the whole of the part of the blade that lies between the broadest chord and the tip.

Another beneficial consequence of this new arrangement consists in the fact that the rearward offset of the center of pressure at the tip with respect to the pitch-change axis is reduced by comparison, in particular, with the case of patent FR-2 689 852, and this limits torsional deformation of the blade.

The law governing the change in chord length may advantageously lie between:

a lower limit ABCDE such that the coordinates of the points A, B, C, D and E are as follows:

|   | r/R | L/$\overline{L}$ |
|---|-----|------|
| A | 0    | 0.55 |
| B | 0.66 | 1.1  |
| C | 0.85 | 1.1  |
| D | 0.93 | 0.73 |
| E | 1    | 0.25 | the lines joining these points to form the limit ABCDE being such that:

|    | x | L/$\overline{L}$ |
|----|---|------|
| AB | (r-Ra)/(Rb-Ra) | 0.55 + 0.55x |
| BC | (r-Rb)/(Rc-Rb) | 1.1 |
| CD | (r-Rc)/(Rd-Rc) | 1.1 - 0.37x |
| DE | (r-Rd)/(Re-Rd) | $0.73 - 0.32375x - 0.15625x^2$ | with Ra, Rb, Rc, Rd and Re representing the respective positions of A, B, C, D and E along the blade, and an upper limit FGHIJ, such that the coordinates of the points F, G, H, I and J are as follows:

|   | r/R | L/$\overline{L}$ |
|---|-----|------|
| F | 0    | 0.65 |
| G | 0.66 | 1.2  |
| H | 0.85 | 1.2  |
| I | 0.97 | 0.83 |
| J | 1    | 0.45 | the lines joining these points to form the limit FGHIJ being such that:

|    | x               | L/L̄                        |
|----|-----------------|-----------------------------|
| FG | (r-Rf)/(Rg-Rf)  | 0.65 + 0.55x                |
| GH | (r-Rg)/(Rh-Rg)  | 1.2                         |
| HI | (r-Rh)/(Ri-Rh)  | 1.2 − 0.37x                 |
| IJ | (r-Ri)/(Rj-Ri)  | 0.83 − 0.0925x − 0.2875x$^2$ | with Rf, Rg, Rh, Ri and Rj representing the respective positions of F, G, H, I and J along the blade.

Between the lower limit ABCDE and the upper limit FGHIJ, a preferred curve is formed by the points P, Q, R, S and T whose coordinates are as follows:

|   | r/R      | L/L̄       |
|---|----------|-----------|
| P | 0.20223  | 0.7784    |
| Q | 0.66     | 1.168864  |
| R | 0.85     | 1.168864  |
| S | 0.95     | 0.779222  |
| T | 1        | 0.351538  | the lines joining these points to form the curve PQRST being such that:

|    | x              | L/L̄                          |
|----|----------------|------------------------------|
| PQ | (r-Rp)/(Rq-Rp) | 0.778400 + 0.390464x         |
| QR | (r-Rq)/(Rr-Rq) | 1.168864                     |
| RS | (r-Rr)/(Rs-Rr) | 1.168864 − 0.389642x         |
| ST | (r-Rs)/(Rt-Rs) | 0.779222 − 0.194821x − 0.232863x$^2$ | with Rp, Rq, Rr, Rs and Rt representing the respective positions of P, Q, R, S and T along the blade.

Likewise, the law governing the change in offset of the center of pressure may preferably lie between:

a lower limit A'B'C'D'E' such that the coordinates of the points A', B', C', D' and E' are as follows:

|    | r/R  | Y'f/R   |
|----|------|---------|
| A' | 0    | 0       |
| B' | 0.66 | +0.005  |
| C' | 0.85 | +0.005  |
| D' | 0.93 | −0.053  |
| E' | 1    | −0.105  | the lines joining these points to form the limit A'B'C'D'E' being such that:

|     | x                  | Y'f/R                        |
|-----|--------------------|------------------------------|
| A'B'| (r-Ra')/(Rb'-Ra')  | +0.005x                      |
| B'C'| (r-Rb')/(Rc'-Rb')  | +0.005                       |
| C'D'| (r-Rc')/(Rd'-Rc')  | +0.005 − 0.058x              |
| D'E'| (r-Rd')/(Re'-Rd')  | −0.053 − 0.05075x − 0.00125x$^2$ | with Ra', Rb', Rc', Rd' and Re' representing the respective positions of A', B', C', D' and E' along the blade, and an upper limit F'G'H'I'J', such that the coordinates of the points F', G', H', I' and J' are as follows:

|    | r/R  | Y'f/R   |
|----|------|---------|
| F' | 0    | 0       |
| G' | 0.66 | +0.030  |
| H' | 0.85 | +0.030  |
| I' | 0.97 | −0.013  |
| J' | 1    | −0.050  | the lines joining these points to form the limit F'G'H'I'J' being such that:

|     | x                  | Y'f/R                        |
|-----|--------------------|------------------------------|
| F'G'| (r-Rf')/(Rg'-Rf')  | +0.03x                       |
| G'H'| (r-Rg')/(Rh'-Rg')  | +0.03                        |
| H'I'| (r-Rh')/(Ri'-Rh')  | +0.03 − 0.043x               |
| I'J'| (r-Ri')/(Rj'-Ri')  | −0.013 − 0.01075x − 0.02625x$^2$ | with Rf', Rg', Rh', Ri' and Rj' representing the respective positions of F', G', H', I' and J' along the blade.

Between the lower limit A'B'C'D'E' and the upper limit F'G'H'I'J', a preferred curve is formed by the points P', Q', R', S' and T' whose coordinates are as follows:

|    | r/R      | Y'f/R     |
|----|----------|-----------|
| P' | 0.20223  | +0.003396 |
| Q' | 0.66     | +0.011083 |
| R' | 0.85     | +0.011083 |
| S' | 0.95     | −0.035547 |
| T' | 1        | −0.072113 | the lines joining these points to form the curve P'Q'R'S'T' being such that:

|      | x                  | Y'f/R                           |
|------|--------------------|---------------------------------|
| P'Q' | (r-Rp')/(Rq'-Rp')  | +0.003396 +0.007687x            |
| Q'R' | (r-Rq')/(Rr'-Rq')  | +0.011083                       |
| R'S' | (r-Rr')/(Rs'-Rr')  | +0.011083 − 0.046630x           |
| S'T' | (r-Rs')/(Rt'-Rs')  | −0.035547 − 0.023315x − 0.013251x$^2$ | with Rp', Rq', Rr', Rs' and Rt' representing the respective positions of P', Q', R', S' and T' along the blade.

Advantageously, the parameters of the laws governing variations along said longitudinal length and for each of said regions, on the one hand in the chord length L of each section with respect to the mean chord L̄ and on the other hand in the offset Y'f of the center of pressure of each section from the pitch-change axis, ensure that the overall center of pressure of said blade is positioned more or less on said pitch-change axis.

The law governing the change in vertical shift of the centers of pressure Zv/R may, moreover, be such that the centers of pressure of the profiles at the blade tip are appreciably lower than the inboard part of the blade. The marginal vortex generated by the outboard end of one blade is thus further from the following blade, the result of this being that it reduces the strength of the interaction, particularly in hovering flight. This leads to a clear reduction in the power absorbed by the rotor, especially in hovering and low-speed flight.

Advantageously, this law governing the change in the vertical shift of the center of pressure will lie between:

a lower limit A"B"C"D"E" such that the coordinates of the points A", B", C", D" and E" are as follows:

|    | r/R  | Zv/R   |
|----|------|--------|
| A' | 0    | −0.001 |
| B' | 0.66 | −0.001 |
| C' | 0.85 | −0.001 |
| D' | 0.93 | −0.001 |
| E' | 1    | −0.015 | the lines joining these points to form the limit A"B"C"D"E" being such that:

|      | x                   | Zv/R             |
|------|---------------------|------------------|
| A"B" | (r-Ra")/(Rb"-Ra")   | −0.001           |
| B"C" | (r-Rb")/(Rc"-Rb")   | −0.001           |
| C"D" | (r-Rc")/(Rd"-Rc")   | −0.001           |
| D"E" | (r-Rd")/(Re"-Rd")   | −0.001 − 0.014x² | with Ra", Rb", Rc", Rd" and Re" representing the respective positions of A", B", C", D" and E" along the blade, and an upper limit F"G"H"I"J", such that the coordinates of the points F", G", H", I" and J" are as follows:

|    | r/R  | Zv/R   |
|----|------|--------|
| F" | 0    | +0.001 |
| G" | 0.66 | +0.001 |
| H" | 0.85 | +0.001 |
| I" | 0.97 | +0.001 |
| J" | 1    | −0.005 | the lines joining these points to form the limit F"G"H"I"J" being such that:

|      | x                 | Zv/R             |
|------|-------------------|------------------|
| F"G" | (r-Rf")/(Rg"-Rf") | +0.001           |
| G"H" | (r-Rg")/(Rh"-Rg") | +0.001           |
| H"I" | (r-Rh")/(Ri"-Rh") | +0.001           |
| I"J" | (r-Ri")/(Rj"-Ri") | +0.001 − 0.006x² | with Rf", Rg", Rh", Ri" and Rj" representing the respective positions of F", G", H", I" and J" along the blade.

Between the lower limit A"B"C"D"E" and the upper limit F"G"H"I"J", a preferred curve is formed by the points P", Q", R", S" and T" whose coordinates are as follows:

|    | r/R     | Zv/R      |
|----|---------|-----------|
| P" | 0.20223 | 0         |
| Q" | 0.66    | 0         |
| R" | 0.85    | 0         |
| S" | 0.95    | 0         |
| T" | 1       | −0.009050 | the lines joining these points to form the curve P"Q"R"S"T" being such that:

|      | x                 | Zv/R      |
|------|-------------------|-----------|
| P"Q" | (r-Rp")/(Rq"-Rp") | 0         |
| Q"R" | (r-Rq")/(Rr"-Rq") | 0         |
| R"S" | (r-Rr")/(Rs"-Rr") | 0         |
| S"T" | (r-Rs")/(Rt"-Rs") | −0.00905x² | with Rp", Rq", Rr", Rs" and Rt" representing the respective positions of P", Q", R", S" and T" along the blade.

The law governing the change in relative thickness of the sections e/L may, in addition, lie between:

a lower limit UVW, such that the coordinates of the points U, V and W are as follows:

|   | r/R | e/L  |
|---|-----|------|
| U | 0   | 0.14 |
| V | 0.4 | 0.14 |
| W | 1   | 0.06 | the lines joining these points to form the limit UVW being such that:

|    | x             | e/L          |
|----|---------------|--------------|
| UV | (r-Ru)/(Rv-Ru) | 0.14         |
| VW | (r-Rv)/(Rw-Rv) | 0.14 − 0.08x | with Ru, Rv and Rw representing the respective positions of U, V and W along the blade, and an upper limit XYZ, such that the coordinates of the points X, Y and Z are as follows:

|   | r/R | e/L  |
|---|-----|------|
| X | 0   | 0.16 |
| Y | 0.4 | 0.16 |
| Z | 1   | 0.08 | the lines joining these points to form the limit XYZ being such that:

|    | x             | e/L          |
|----|---------------|--------------|
| XY | (r-Rx)/(Ry-Rx) | 0.16         |
| YZ | (r-Ry)/(Rz-Ry) | 0.16 − 0.08x | with Rx, Ry and Rz representing the respective positions of X, Y and Z along the blade.

Between the lower limit UVW and the upper limit XYZ, a preferred curve is formed by the points K, L and M whose coordinates are as follows:

|   | r/R     | e/L  |
|---|---------|------|
| K | 0.20223 | 0.15 |
| L | 0.4     | 0.15 |
| M | 1       | 0.07 | the lines joining these points to form the limit KLM being such that:

|    | x              | e/L          |
|----|----------------|--------------|
| KL | (r-Rk)/(Rl-Rk) | 0.15         |
| LM | (r-Rl)/(Rm-Rk) | 0.15 − 0.08x | with Rk, Rl and Rm representing the respective positions of K, L and M along the blade.

The figures of the appended drawing will make it easier to understand how the invention may be achieved. In these figures, identical references denote similar elements.

Figure 1:
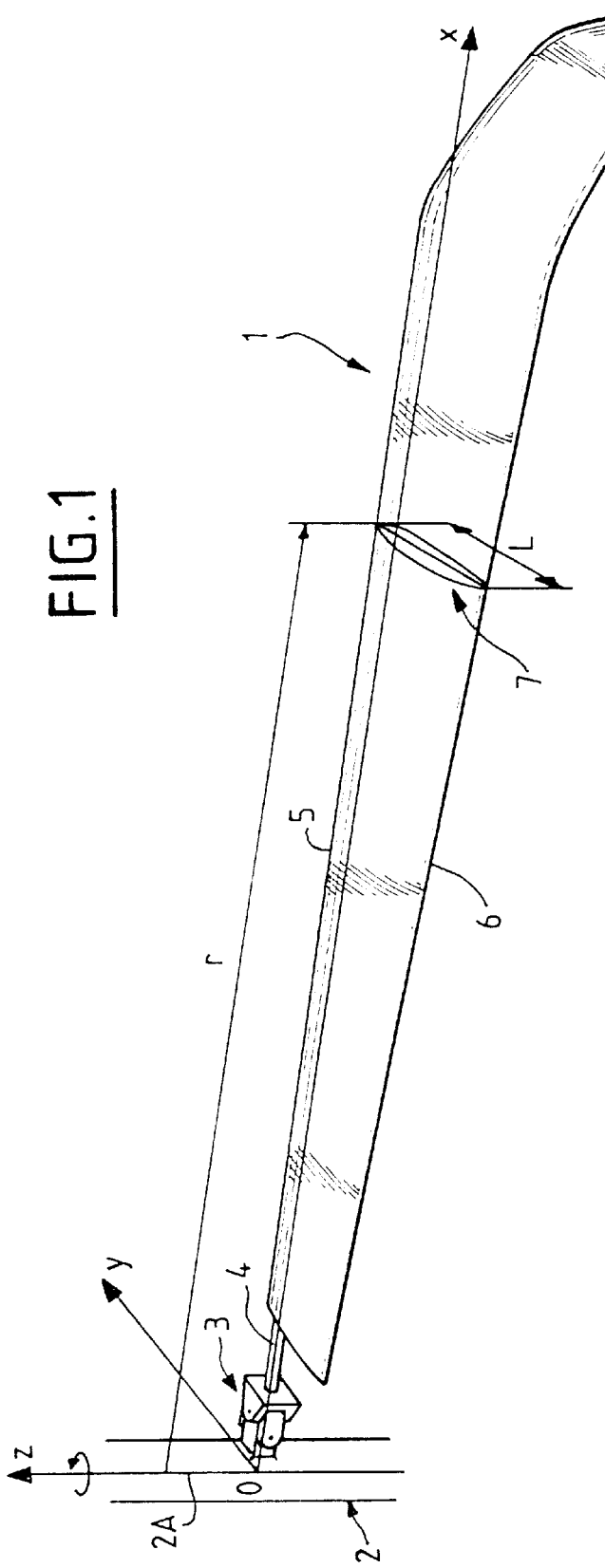
FIG. 1 is a diagrammatic perspective view of a helicopter rotor blade in accordance with the present invention.

The blade 1 with swept-back tip in accordance with the present invention and shown in FIG. 1 forms part of a rotor whose hub 2 is illustrated purely diagrammatically and whose other blades have not been depicted. The blade 1 is connected to the hub 2 by blade articulation and retaining members 3, particularly a pitch-change articulation to change the pitch of the blade about an axis 4 known as the pitch-change axis, as is conventional.

Figure 2:
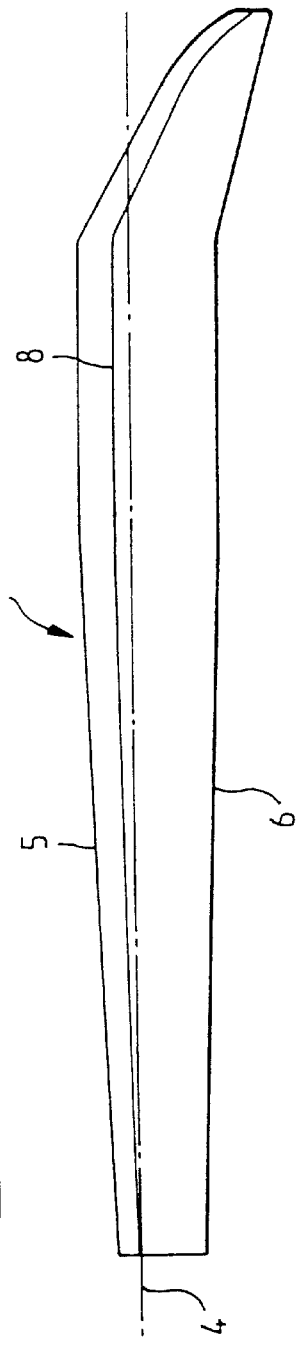
FIG. 2 illustrates, viewed from above, one embodiment of the blade according to the invention.

Furthermore, the blade 1, which has a leading edge 5 and a trailing edge 6, is formed of successive elemental cross sections, one 7 of which is depicted in FIG. 1. Each elemental section 7 is identified by the distance r separating said section from the axis of rotation 2A of the hub, and has a defined chord profile L and a center of pressure (the point at which the variations in aerodynamic lift forces are applied) whose "curve" along the longitudinal span of the blade is depicted by 8 in FIG. 2. The offset between the center of pressure and the pitch-change axis 4 orthogonal to said successive sections 7 determines the sweep of the blade, as seen more clearly in FIG. 2.

The geometric construction that allows the area of a blade 1 according to the invention to be defined precisely will be described below.

The construction reference frame is chosen as being an orthonormal trihedron whose origin 0 is the center of the rotor.

The axis OX is the pitch-change axis 4, which means that the first coordinate coincides with the radius r measured from the center of rotation 0. The second axis OY, orthogonal to the axis OX, constitutes the reference direction for the angular setting, and points, arbitrarily, toward the leading edge 5. The third axis OZ is orthogonal to the plane defined by the axes OX and OY and points, arbitrarily, upward (toward the suction face of the profiles). The trihedron is the correct way up if the rotor turns counterclockwise. It should, however, be clearly understood that all that follows is still valid for a rotor that turns clockwise.

The plane OX, OY will be called the construction plane or the reference plane. The plane OX, OY will be chosen to coincide with the zero lift plane of the blade. The blade area (blade envelope) is generated by a collection of elemental planar sections 7 which are all parallel to one another and parallel to the plane OX, OZ and orthogonal to the pitch-change axis OX.

Each elemental section can be identified by its radius r (distance of the section from the axis OY) lying between R0 (start of the actual blade part) and R (outboard end or tip of the blade).

The parameters that define the contour of any elemental cross section 7 of the blade 1 are generally known, especially from patent FR-2 689 852.

The blade that is the subject of the invention is subdivided into four regions that allow it to be described, independently of the twist and relative thickness of the sections which require special breakdowns specified below. These four regions are:

a first region, which extends from the section R0 that corresponds to the start of the actual blade part, as far as the section R1 situated at approximately 66% of the total radius R;

a second region, which extends from the section R1 as far as the section R2 situated at approximately 85% of the total radius R;

a third region, which extends from the section R2 as far as the section R3 situated between 93% and 97% of the total radius R; and a fourth region, which extends from the section R3 as far as the tip of the blade (radius R).

According to the invention, in these various regions, the chord length L increases generally linearly in said first region, is at its maximum and constant in said second region, decreases linearly in said third region, and decreases according to a parabolic function in said fourth region, meeting the requirement for continuity in the rate of variation of the chord at the boundary where this region meets the third region, and the offset Y'f of the center of pressure from the pitch-change axis in said first region is positive and increases in proportion to the distance r, is at its maximum and constant in said second region, decreases linearly and becomes negative in said third region, so that the sweep angle Λ keeps a constant value approximately equal to 25° backward, and decreases according to a parabolic function in said fourth region, meeting the criterion of continuity of the sweep angle Λ at the boundary where this region meets the third region and until it reaches its lowest negative value at the tip.

Figure 3:
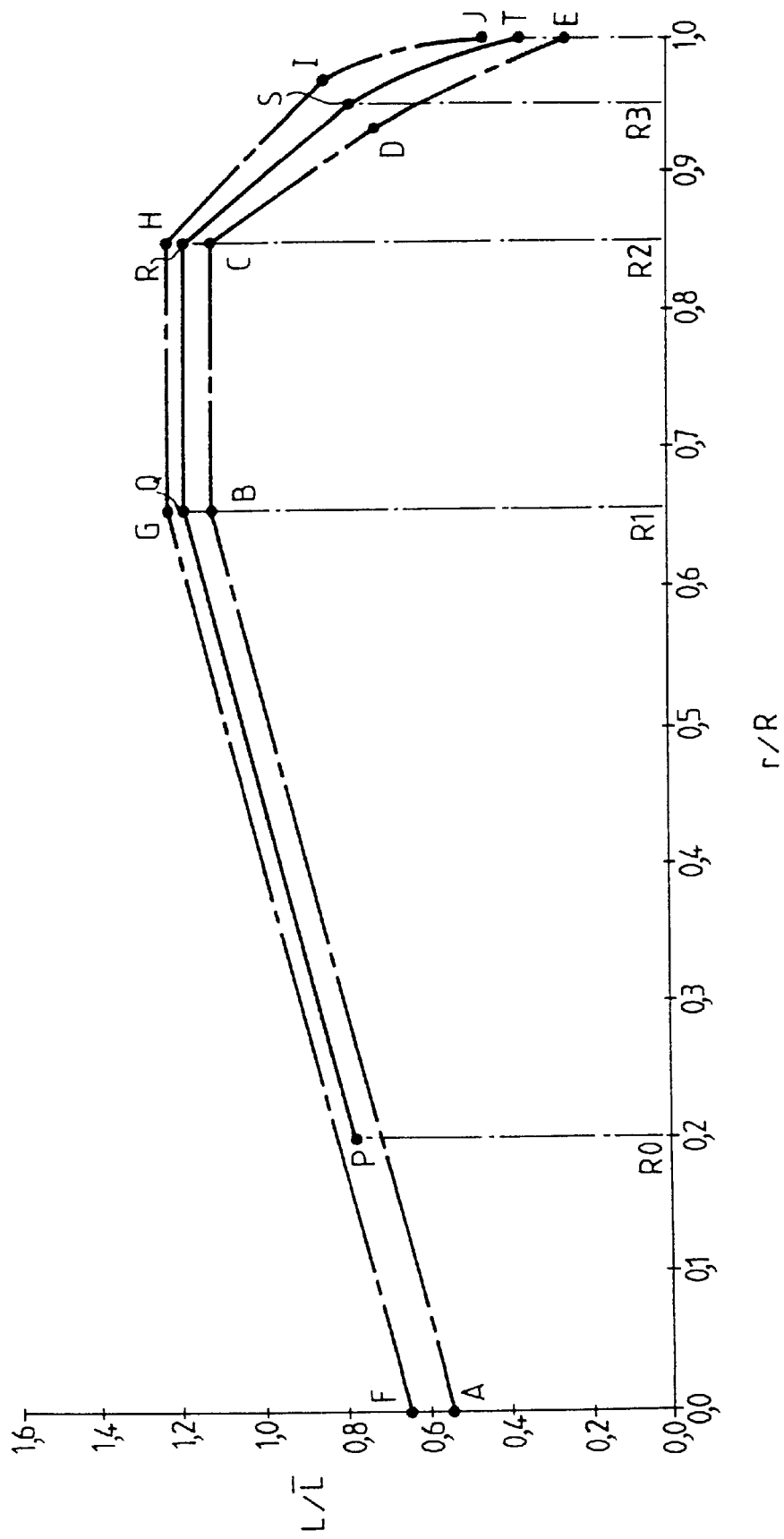
FIG. 3 is a curve showing the variation in chord length along the longitudinal span of the blade.

As can be seen in FIG. 3, the law governing the change in chord length may advantageously lie between:

a lower limit ABCDE such that the coordinates of the points A, B, C, D and E are as follows:

|   | r/R  | L/$\overline{L}$ |
|---|------|------|
| A | 0    | 0.55 |
| B | 0.66 | 1.1  |
| C | 0.85 | 1.1  |
| D | 0.93 | 0.73 |
| E | 1    | 0.25 | the lines joining these points to form the limit ABCDE being such that:

|    |                | x                  | L/L̄                          |
|----|----------------|--------------------|------------------------------|
| AB | (r-Ra)/(Rb-Ra) |                    | 0.55 + 0.55x                 |
| BC | (r-Rb)/(Rc-Rb) |                    | 1.1                          |
| CD | (r-Rc)/(Rd-Rc) |                    | 1.1 − 0.37x                  |
| DE | (r-Rd)/(Re-Rd) |                    | 0.73 − 0.32375x − 0.15625x$^2$ | with Ra, Rb, Rc, Rd and Re representing the respective positions of A, B, C, D and E along the blade, and an upper limit FGHIJ, such that the coordinates of the points F, G, H, I and J are as follows:

|   | r/R  | L/L̄  |
|---|------|------|
| F | 0    | 0.65 |
| G | 0.66 | 1.2  |
| H | 0.85 | 1.2  |
| I | 0.97 | 0.83 |
| J | 1    | 0.45 | the lines joining these points to form the limit FGHIJ being such that:

|    |                | x | L/L̄                         |
|----|----------------|---|-----------------------------|
| FG | (r-Rf)/(Rg-Rf) |   | 0.65 + 0.55x                |
| GH | (r-Rg)/(Rh-Rg) |   | 1.2                         |
| HI | (r-Rh)/(Ri-Rh) |   | 1.2 − 0.37x                 |
| IJ | (r-Ri)/(Rj-Ri) |   | 0.83 − 0.0925x − 0.2875x$^2$ | with Rf, Rg, Rh, Ri and Rj representing the respective positions of F, G, H, I and J along the blade.

Between the lower limit ABCDE and the upper limit FGHIJ, a preferred curve, as shown in FIG. 3, is formed by the points P, Q, R, S and T whose coordinates are as follows:

|   | r/R     | L/L̄      |
|---|---------|----------|
| P | 0.20223 | 0.7784   |
| Q | 0.66    | 1.168864 |
| R | 0.85    | 1.168864 |
| S | 0.95    | 0.779222 |
| T | 1       | 0.351538 | the lines joining these points to form the curve PQRST being such that:

|    |                | x | L/L̄                                  |
|----|----------------|---|--------------------------------------|
| PQ | (r-Rp)/(Rq-Rp) |   | 0.778400 + 0.390464x                 |
| QR | (r-Rq)/(Rr-Rq) |   | 1.168864                             |
| RS | (r-Rr)/(Rs-Rr) |   | 1.168864 − 0.389642x                 |
| ST | (r-Rs)/(Rt-Rs) |   | 0.779222 − 0.194821x − 0.232863x$^2$ | with Rp, Rq, Rr, Rs and Rt representing the respective positions of P, Q, R, S and T along the blade.

Figure 4:
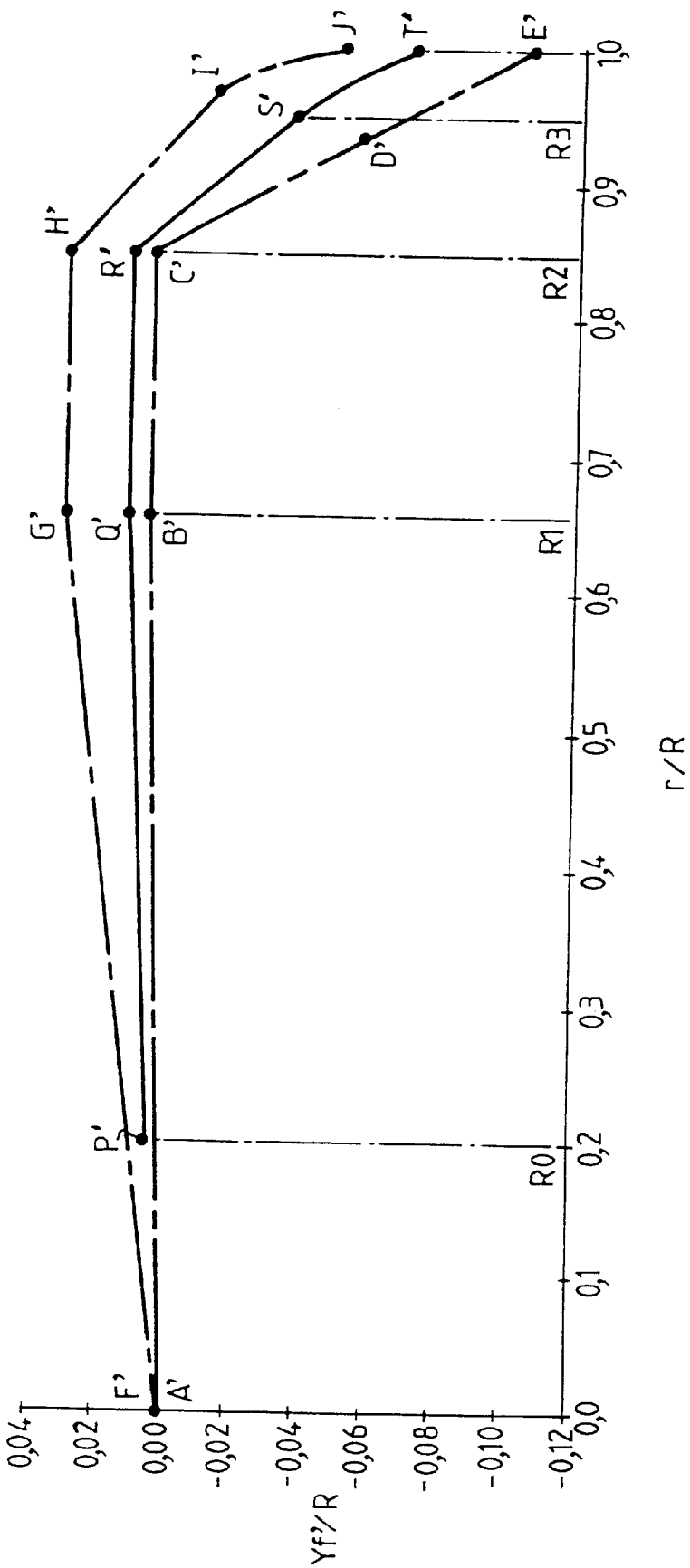
FIG. 4 is a curve showing the change in offset of the center of pressure along the longitudinal span of the blade.

Likewise, as can be seen in FIG. 4, the law governing the change in offset of the center of pressure may preferably lie between:

a lower limit A'B'C'D'E' such that the coordinates of the points A', B', C', D' and E' are as follows:

|    | r/R  | Y'f/R  |
|----|------|--------|
| A' | 0    | 0      |
| B' | 0.66 | +0.005 |
| C' | 0.85 | +0.005 |
| D' | 0.93 | −0.053 |
| E' | 1    | −0.105 | the lines joining these points to form the limit A'B'C'D'E' being such that:

|      |                    | x | Y'f/R                          |
|------|--------------------|---|--------------------------------|
| A'B' | (r-Ra')/(Rb'-Ra')  |   | +0.005                         |
| B'C' | (r-Rb')/(Rc'-Rb')  |   | +0.005                         |
| C'D' | (r-Rc')/(Rd'-Rc')  |   | +0.005 − 0.058x                |
| D'E' | (r-Rd')/(Re'-Rd')  |   | −0.053 − 0.05075x − 0.00125x$^2$ | with Ra', Rb', Rc', Rd' and Re' representing the respective positions of A', B', C', D' and E' along the blade, and an upper limit F'G'H'I'J', such that the coordinates of the points F', G', H', I' and J' are as follows:

|    | r/R  | Y'f/R  |
|----|------|--------|
| F' | 0    | 0      |
| G' | 0.66 | +0.030 |
| H' | 0.85 | +0.030 |
| I' | 0.97 | −0.013 |
| J' | 1    | −0.050 | the lines joining these points to form the limit F'G'H'I'J' being such that:

|      |                    | x | Y'f/R                           |
|------|--------------------|---|---------------------------------|
| F'G' | (r-Rf')/(Rg'-Rf')  |   | +0.03x                          |
| G'H' | (r-Rg')/(Rh'-Rg')  |   | +0.03                           |
| H'I' | (r-Rh')/(Ri'-Rh')  |   | +0.03 − 0.043x                  |
| I'J' | (r-Ri')/(Rj'-Ri')  |   | −0.013 − 0.01075x − 0.02625x$^2$ | with Rf', Rg', Rh', Ri' and Rj' representing the respective positions of F', G', H', I' and J' along the blade.

Between the lower limit A'B'C'D'E' and the upper limit F'G'H'I'J', a preferred curve, as shown in FIG. 4, is formed by the points P', Q', R', S' and T' whose coordinates are as follows:

|    | r/R     | Y'f/R     |
|----|---------|-----------|
| P' | 0.20223 | +0.003396 |
| Q' | 0.66    | +0.011083 |
| R' | 0.85    | +0.011083 |
| S' | 0.95    | −0.035547 |
| T' | 1       | −0.072113 | the lines joining these points to form the curve P'Q'R'S'T' being such that:

|  | x | Y'f/R |
|---|---|---|
| P'Q' | $(r-Rp')/(Rq'-Rp')$ | $+0.003396 + 0.007687x$ |
| Q'R' | $(r-Rq')/(Rr'-Rq')$ | $+0.011083$ |
| R'S' | $(r-Rr')/(Rs'-Rr')$ | $+0.011083 - 0.046630x$ |
| S'T' | $(r-Rs')/(Rt'-Rs')$ | $-0.035547 - 0.023315x - 0.013251x^2$ | with Rp', Rq', Rr', Rs' and Rt' representing the respective positions of P', Q', R', S' and T' along the blade.

As already stated, it is also advantageous that the parameters of the laws governing variations along said longitudinal length and for each of said regions, on the one hand in the chord length L of each section with respect to the mean chord, $\overline{L}$ and on the other hand in the offset Y'f of the center of pressure of each section from the pitch-change axis, ensure that the overall center of pressure of said blade is positioned more or less on said pitch-change axis.

Figure 5:
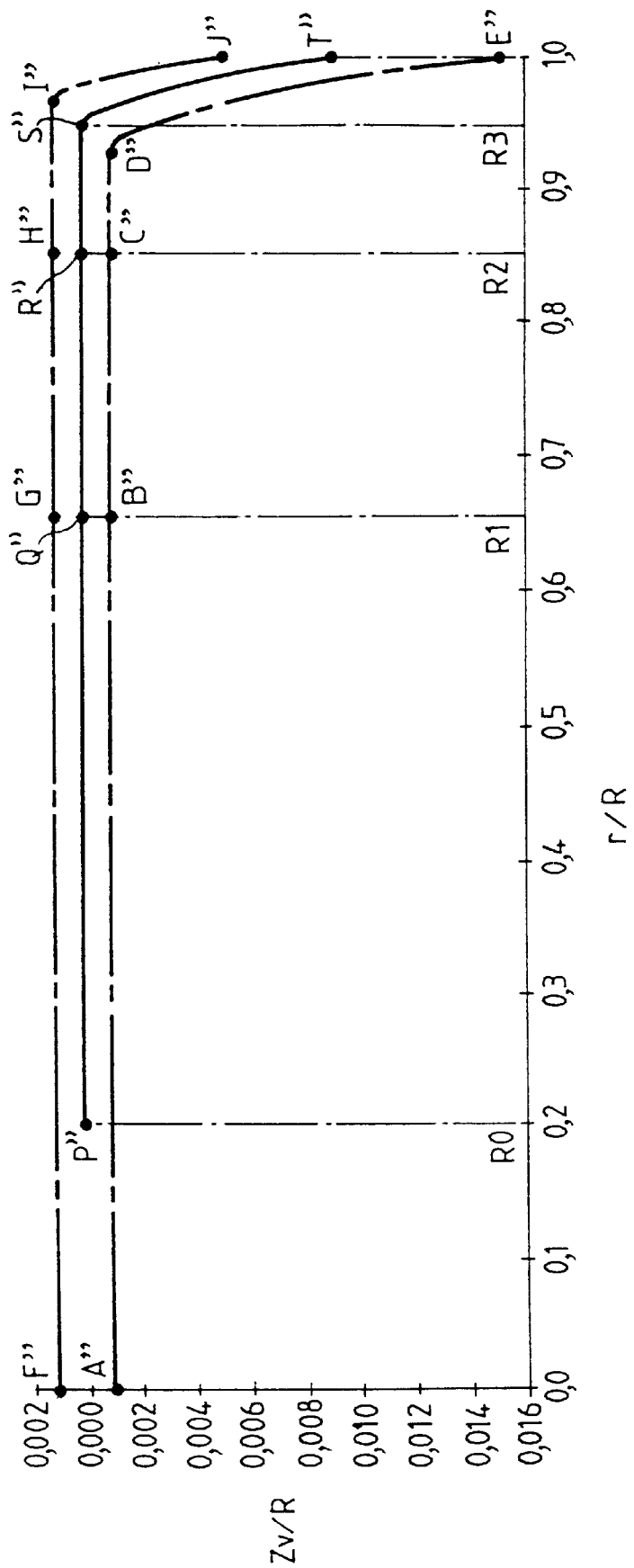
FIG. 5 is a curve showing the vertical shift in the center of twist with respect to the construction plane, as defined later, of the blade.

Furthermore, as can be seen in FIG. 5, the law governing the change in the vertical shift of the center of pressure Zv/R may, moreover, lie between:

a lower limit A"B"C"D"E" such that the coordinates of the points A", B", C", D" and E" are as follows:

|  | r/R | Zv/R |
|---|---|---|
| A" | 0 | $-0.001$ |
| B" | 0.66 | $-0.001$ |
| C" | 0.85 | $-0.001$ |
| D" | 0.93 | $-0.001$ |
| E" | 1 | $-0.015$ | the lines joining these points to form the limit A"B"C"D"E" being such that:

|  | x | Zv/R |
|---|---|---|
| A"B" | $(r-Ra")/(Rb"-Ra")$ | $-0.001$ |
| B"C" | $(r-Rb")/(Rc"-Rb")$ | $-0.001$ |
| C"D" | $(r-Rc")/(Rd"-Rc")$ | $-0.001$ |
| D"E" | $(r-Rd")/(Re"-Rd")$ | $-0.001 - 0.014x^2$ | with Ra", Rb", Rc", Rd" and Re" representing the respective positions of A", B", C", D" and E" along the blade, and an upper limit F"G"H"I"J", such that the coordinates of the points F", G", H", I" and J" are as follows:

|  | r/R | Zv/R |
|---|---|---|
| F" | 0 | $+0.001$ |
| G" | 0.66 | $+0.001$ |
| H" | 0.85 | $+0.001$ |
| I" | 0.97 | $+0.001$ |
| J" | 1 | $-0.005$ | the lines joining these points to form the limit F"G"H"I"J" being such that:

|  | x | Zv/R |
|---|---|---|
| F"G" | $(r-Rf")/(Rg"-Rf")$ | $+0.001$ |
| G"H" | $(r-Rg")/(Rh"-Rg")$ | $+0.001$ |
| H"I" | $(r-Rh")/(Ri"-Rh")$ | $+0.001$ |
| I"J" | $(r-Ri")/(Rj"-Ri")$ | $+0.001 - 0.006x^2$ | with Rf", Rg", Rh", Ri" and Rj" representing the respective positions of F", G", H", I" and J" along the blade.

Between the lower limit A"B"C"D"E" and the upper limit F"G"H"I"J", a preferred curve, as shown in FIG. 5, is formed by the points P", Q", R", S" and T" whose coordinates are as follows:

|  | r/R | Zv/R |
|---|---|---|
| P" | 0.20223 | 0 |
| Q" | 0.66 | 0 |
| R" | 0.85 | 0 |
| S" | 0.95 | 0 |
| T" | 1 | $-0.009050$ | the lines joining these points to form the curve P"Q"R"S"T" being such that:

|  | x | Zv/R |
|---|---|---|
| P"Q" | $(r-Rp")/(Rq"-Rp")$ | 0 |
| Q"R" | $(r-Rq")/(Rr"-Rq")$ | 0 |
| R"S" | $(r-Rr")/(Rs"-Rr")$ | 0 |
| S"T" | $(r-Rs")/(Rt"-Rs")$ | $-0.00905x^2$ | with Rp", Rq", Rr", Rs" and Rt" representing the respective positions of P", Q", R", S" and T" along the blade.

Furthermore, the recommended blade shape may be given a linear aerodynamic twist, with a total amplitude of more or less between $-8°$ and $-14°$ between the center of the rotor and the tip of the blade. Consistent with common practice, the twist is said to be negative when the leading edge of the outboard sections is lower than that of the sections located closer to the center. To obtain the geometric angular setting of each section, measured with respect to the reference chord, the zero-lift incidence of the profile in question needs to be added to the aerodynamic twist, as explained in detail in document FR-A-2 689 852.

With the reduction in chord at the root as recommended by the present invention, it proves necessary to increase the relative thickness to more than 14% in order to maintain a torsional stiffness that is at least equivalent to that of conventional blades. Nonetheless, 16% should not be exceeded, this being in order to avoid any degradation to the lift capability, and in order not to increase the aerodynamic drag. The relative thickness needs to be kept between 14 and 16% in the region of the blade where the chord is still small. However, beyond the section situated at 40% of the span, the chord becomes large and the relative thickness can begin to decrease in order to delay the detrimental effects of the compressibility of air.

At the tip end, the intensity of the shockwaves need to be minimized when the blade is advancing during high-speed flight. The shape in accordance with the present invention uses profiles in which the relative thickness does not exceed 8% at this end. However, this thickness must not be reduced to less than 6%, this being to maintain sufficient lift capability which is still needed when the tip is retreating.

Between the 40% of span section and the tip, the relative thickness will decrease more or less linearly. Breaking the blade down into two regions alone is sufficient to describe this change.

Figure 6:
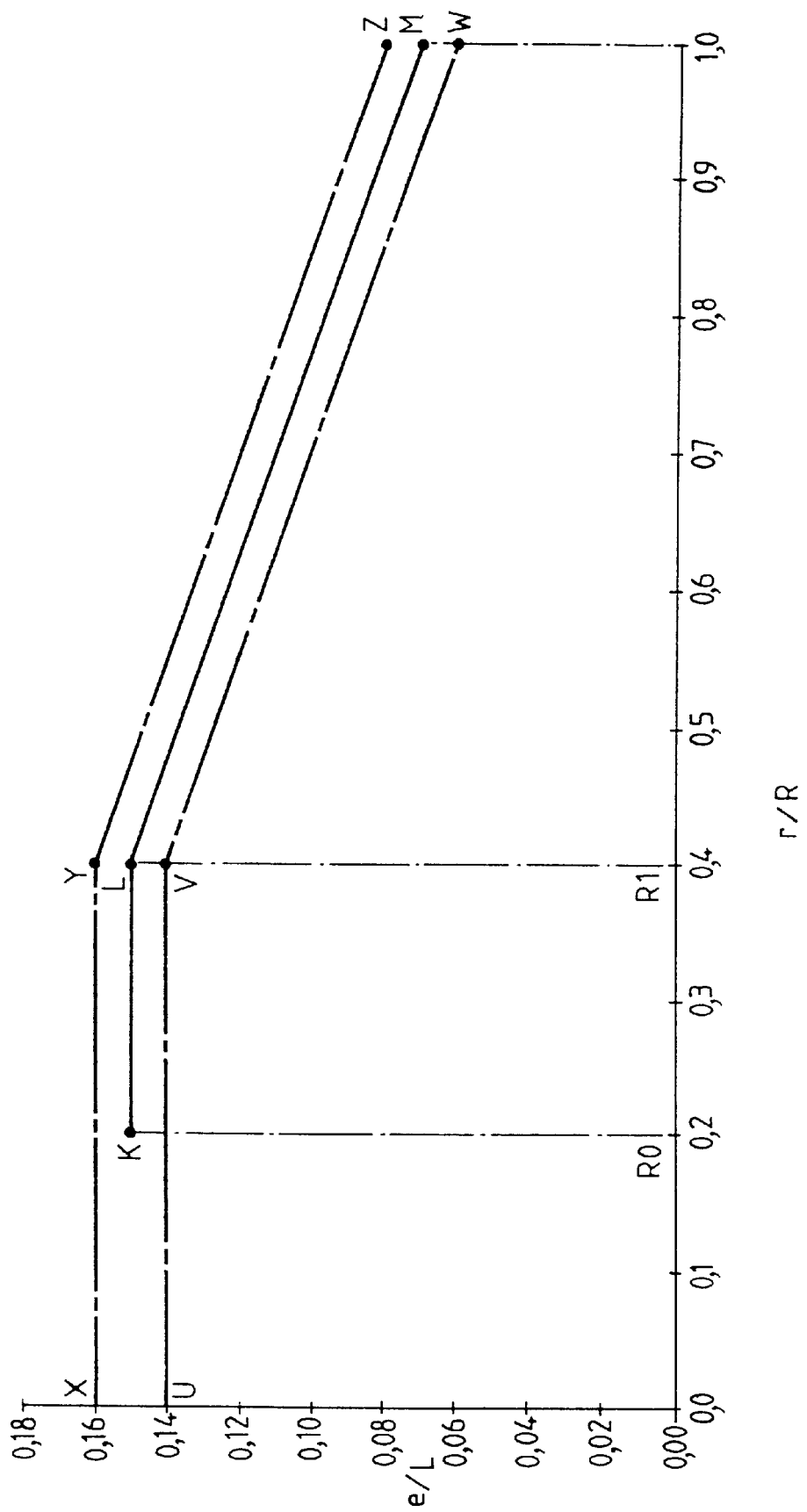
FIG. 6 is a curve showing the change in thickness of the blade cross sections.

As can be seen in FIG. 6, the law governing the change in relative thickness of the sections e/L may thus lie between:

a lower limit UVW, such that the coordinates of the points U, V and W are as follows:

|   | r/R | e/L |
|---|---|---|
| U | 0 | 0.14 |
| V | 0.4 | 0.14 |
| W | 1 | 0.06 | the lines joining these points to form the limit UVW being such that:

|   | x | e/L |
|---|---|---|
| UV | (r-Ru)/(Rv-Ru) | 0.14 |
| VW | (r-Rv)/(Rw-Rv) | 0.14 − 0.08x | with Ru, Rv and Rw representing the respective positions of U, V and W along the blade, and an upper limit XYZ, such that the coordinates of the points X, Y and Z are as follows:

|   | r/R | e/L |
|---|---|---|
| X | 0 | 0.16 |
| Y | 0.4 | 0.16 |
| Z | 1 | 0.08 | the lines joining these points to form the limit XYZ being such that:

|   | x | e/L |
|---|---|---|
| XY | (r-Rx)/(Ry-Rx) | 0.16 |
| YZ | (r-Ry)/(Rz-Ry) | 0.16 − 0.08x | with Rx, Ry and Rz representing the respective positions of X, Y and Z along the blade.

Between the lower limit UVW and the upper limit XYZ, a preferred curve, as shown in FIG. 6, is formed by the points K, L and M whose coordinates are as follows:

|   | r/R | e/L |
|---|---|---|
| K | 0.20223 | 0.15 |
| L | 0.4 | 0.15 |
| M | 1 | 0.07 | the lines joining these points to form the limit KLM being such that:

|   | x | e/L |
|---|---|---|
| KL | (r-Rk)/(Rl-Rk) | 0.15 |
| LM | (r-Rl)/(Rm-Rk) | 0.15 − 0.08x | with Rk, Rl and Rm representing the respective positions of K, L and M along the blade.

We claim:

1. A blade with a swept-back tip for rotary wings of an aircraft, which blade is intended to form part of a rotor whose hub (2) is connected to said blade (1), which can be rotated about an axis of said hub, said blade (1) having a leading edge (5) and a trailing edge (6), and being formed of successive elemental cross sections (7) identified by a distance r separating each of them from the axis of rotation of the said hub and each having a defined chord profile and a center of pressure whose offset from a pitch-change axis, orthogonal to each of said sections, determines the sweep of said blade, wherein, said blade (1) subdividing along its longitudinal length into four regions, namely a first region extending from an inboard edge of the blade R0 to a first section R1 situated at approximately 66% of the distance along the total length of the blade, measured from the axis of rotation of the hub, a second region extending from the first section R1 to a second section R2 situated at approximatley 85% of the distance along the total length of the blade, a third region extending from the second section R2 to a third section R3 situated between 93% and 97% of the distance along the total length of the blade, and a fourth region extending from the third section R3 to a free outboard edge R of the blade, the chord length L increases generally linearly in said first region, is at its maximum and constant in said second region, decreases linearly in said third region, and decreases according to a parabolic function in said fourth region, satisfying conditions of continuity of a rate of chord variation at a boundary where this region meets the third region, and an offset Y'f of the center of pressure from the pitch-change axis in said first region is positive and increases in proportion to the distance r, is at its maximum and constant in said second region, decreases linearly and becomes negative in said third region, so that a sweep angle Λ keeps a constant value approximately equal to 25° backward, and decreases according to a parabolic function in said fourth region, satisfying the condition of continuity of the sweep angle Λ at the boundary where this region meets the third region.

2. The blade as claimed in claim 1, wherein the law governing the change in chord length lies between:

a lower limit ABCDE such that the coordinates of the points A, B, C, D and E are as follows:

|   | r/R | L/L̄ |
|---|---|---|
| A | 0 | 0.55 |
| B | 0.66 | 1.1 |
| C | 0.85 | 1.1 |
| D | 0.93 | 0.73 |
| E | 1 | 0.25 | the lines joining these points to form the limit ABCDE being such that:

|    |                 | x    | L/$\overline{L}$           |
| -- | --------------- | ---- | -------------------------- |
| AB | (r-Ra)/(Rb-Ra)  |      | 0.55 + 0.55x               |
| BC | (r-Rb)/(Rc-Rb)  |      | 1.1                        |
| CD | (r-Rc)/(Rd-Rc)  |      | 1.1 − 0.37x                |
| DE | (r-Rd)/(Re-Rd)  |      | 0.73 − 0.32375x − 0.15625x$^2$ | with Ra, Rb, Rc, Rd and Re representing the respective positions of A, B, C, D and E along the blade, and an upper limit FGHIJ, such that the coordinates of the points F, G, H, I and J are as follows:

|   | r/R  | L/$\overline{L}$ |
| - | ---- | ---- |
| F | 0    | 0.65 |
| G | 0.66 | 1.2  |
| H | 0.85 | 1.2  |
| I | 0.97 | 0.83 |
| J | 1    | 0.45 | the lines joining these points to form the limit FGHIJ being such that:

|    |                | x | L/$\overline{L}$          |
| -- | -------------- | - | ------------------------- |
| FG | (r-Rf)/(Rg-Rf) |   | 0.65 + 0.55x              |
| GH | (r-Rg)/(Rh-Rg) |   | 1.2                       |
| HI | (r-Rh)/(Ri-Rh) |   | 1.2 − 0.37x               |
| IJ | (r-Ri)/(Rj-Ri) |   | 0.83 − 0.0925x − 0.2875x$^2$ | with Rf, Rg, Rh, Ri and Rj representing the respective positions of F, G, H, I and J along the blade.

3. The blade as claimed in claim 2, wherein, between the lower limit ABCDE and the upper limit FGHIJ, a preferred curve is formed by the points P, Q, R, S and T whose coordinates are as follows:

|   | r/R     | L/$\overline{L}$ |
| - | ------- | -------- |
| P | 0.20223 | 0.7784   |
| Q | 0.66    | 1.168864 |
| R | 0.85    | 1.168864 |
| S | 0.95    | 0.779222 |
| T | 1       | 0.351538 | the lines joining these points to form the curve PQRST being such that:

|    |                | x | L/$\overline{L}$               |
| -- | -------------- | - | ------------------------------ |
| PQ | (r-Rp)/(Rq-Rp) |   | 0.778400 + 0.390464x           |
| QR | (r-Rq)/(Rr-Rq) |   | 1.168864                       |
| RS | (r-Rr)/(Rs-Rr) |   | 1.168864 − 0.389642x           |
| ST | (r-Rs)/(Rt-Rs) |   | 0.779222 − 0.194821x − 0.232863x$^2$ | with Rp, Rq, Rr, Rs and Rt representing the respective positions of P, Q, R, S and T along the blade.

4. The blade as claimed in claim 1, wherein the law governing the change in offset of the center of pressure lies between:

a lower limit A'B'C'D'E' such that the coordinates of the points A', B', C', D' and E' are as follows:

|    | r/R  | Y'f/R  |
| -- | ---- | ------ |
| A' | 0    | 0      |
| B' | 0.66 | +0.005 |
| C' | 0.85 | +0.005 |
| D' | 0.93 | −0.053 |
| E' | 1    | −0.105 | the lines joining these points to form the limit A'B'C'D'E' being such that:

|      |                   | x | Y'f/R                      |
| ---- | ----------------- | - | -------------------------- |
| A'B' | (r-Ra')/(Rb'-Ra') |   | +0.005x                    |
| B'C' | (r-Rb')/(Rc'-Rb') |   | +0.005                     |
| C'D' | (r-Rc')/(Rd'-Rc') |   | +0.005 − 0.058x            |
| D'E' | (r-Rd')/(Re'-Rd') |   | −0.053 − 0.05075x − 0.00125x$^2$ | with Ra', Rb', Rc', Rd' and Re' representing the respective positions of A', B', C', D' and E' along the blade, and an upper limit F'G'H'I'J', such that the coordinates of the points F', G', H', I' and J' are as follows:

|    | r/R  | Y'f/R  |
| -- | ---- | ------ |
| F' | 0    | 0      |
| G' | 0.66 | +0.030 |
| H' | 0.85 | +0.030 |
| I' | 0.97 | −0.013 |
| J' | 1    | −0.050 | the lines joining these points to form the limit F'G'H'I'J' being such that:

|      |                   | x | Y'f/R                          |
| ---- | ----------------- | - | ------------------------------ |
| F'G' | (r-Rf')/(Rg'-Rf') |   | +0.03x                         |
| G'H' | (r-Rg')/(Rh'-Rg') |   | +0.03                          |
| H'I' | (r-Rh')/(Ri'-Rh') |   | +0.03 − 0.043x                 |
| I'J' | (r-Ri')/(Rj'-Ri') |   | −0.013 − 0.01075x − 0.02625x$^2$ | with Rf', Rg', Rh', Ri' and Rj' representing the respective positions of F', G', H', I' and J' along the blade.

5. The blade as claimed in claim 4, wherein, between the lower limit A'B'C'D'E' and the upper limit F'G'H'I'J', a preferred curve is formed by the points P', Q', R', S' and T' whose coordinates are as follows:

|    | r/R     | Y'f/R     |
| -- | ------- | --------- |
| P' | 0.20223 | +0.003396 |
| Q' | 0.66    | +0.011083 |
| R' | 0.85    | +0.011083 |
| S' | 0.95    | −0.035547 |
| T' | 1       | −0.072113 | the lines joining these points to form the curve P'Q'R'S'T' being such that:

|  | x | Y'f/R |
|---|---|---|
| P'Q' | (r-Rp')/(Rq'-Rp') | +0.003396 + 0.007687x |
| Q'R' | (r-Rq')/(Rr'-Rq') | +0.011083 |
| R'S' | (r-Rr')/(Rs'-Rr') | +0.011083 − 0.046630x |
| S'T' | (r-Rs')/(Rt'-Rs') | −0.035547 − 0.023315x − 0.013251$x^2$ | with Rp', Rq', Rr', Rs' and Rt' representing the respective positions of P', Q', R', S' and T' along the blade.

6. The blade as claimed in claim 1, wherein the parameters of the laws governing variations along said longitudinal length and for each of said regions, on the one hand in the chord length L of each section with respect to the mean chord $\overline{L}$, and on the other hand in the offset Y'f of the center of pressure of each section from the pitch-change axis, ensure that the overall center of pressure of said blade is positioned more or less on said pitch-change axis.

7. The blade as claimed in claim 1, wherein the law governing the change in the vertical shift of the center of pressure Zv/R lies between:

a lower limit A"B"C"D"E" such that the coordinates of the points A", B", C", D" and E" are as follows:

|  | r/R | Zv/R |
|---|---|---|
| A" | 0 | −0.001 |
| B" | 0.66 | −0.001 |
| C" | 0.85 | −0.001 |
| D" | 0.93 | −0.001 |
| E" | 1 | −0.015 | the lines joining these points to form the limit A"B"C"D"E" being such that:

|  | x | Zv/R |
|---|---|---|
| A"B" | (r-Ra")/(Rb"-Ra") | −0.001 |
| B"C" | (r-Rb")/(Rc"-Rb") | −0.001 |
| C"D" | (r-Rc")/(Rd"-Rc") | −0.001 |
| D"E" | (r-Rd")/(Re"-Rd") | −0.001 − 0.014$x^2$ | with Ra", Rb", Rc", Rd" and Re" representing the respective positions of A", B", C", D" and E" along the blade, and an upper limit F"G"H"I"J", such that the coordinates of the points F", G", H", I" and J" are as follows:

|  | r/R | Zv/R |
|---|---|---|
| F" | 0 | +0.001 |
| G" | 0.66 | +0.001 |
| H" | 0.85 | +0.001 |
| I" | 0.97 | +0.001 |
| J" | 1 | −0.005 | the lines joining these points to form the limit F"G"H"I"J" being such that:

|  | x | Zv/R |
|---|---|---|
| F"G" | (r-Rf")/(Rg"-Rf") | +0.001 |
| G"H" | (r-Rg")/(Rh"-Rg") | +0.001 |
| H"I" | (r-Rh")/(Ri"-Rh") | +0.001 |
| I"J" | (r-Ri")/(Rj"-Ri") | +0.001 − 0.006$x^2$ | with Rf", Rg", Rh", Ri" and Rj" representing the respective positions of F", G", H", I" and J" along the blade.

8. The blade as claimed in claim 7, wherein, between the lower limit A"B"C"D"E" and the upper limit F"G"H"I"J", a preferred curve is formed by the points P", Q", R", S" and T" whose coordinates are as follows:

|  | r/R | Zv/R |
|---|---|---|
| P" | 0.20223 | 0 |
| Q" | 0.66 | 0 |
| R" | 0.85 | 0 |
| S" | 0.95 | 0 |
| T" | 1 | −0.009050 | the lines joining these points to form the curve P"Q"R"S"T" being such that:

|  | x | Zv/R |
|---|---|---|
| P"Q" | (r-Rp")/(Rq"-Rp") | 0 |
| Q"R" | (r-Rq")/(Rr"-Rq") | 0 |
| R"S" | (r-Rr")/(Rs"-Rr") | 0 |
| S"T" | (r-Rs")/(Rt"-Rs") | −0.00905$x^2$ | with Rp", Rq", Rr", Rs" and Rt" representing the respective positions of P", Q", R", S" and T" along the blade.

9. The blade as claimed in claim 1, wherein the law governing the change in relative thickness of the sections e/L lies between:

a lower limit UVW, such that the coordinates of the points U, V and W are as follows:

|  | r/R | e/L |
|---|---|---|
| U | 0 | 0.14 |
| V | 0.4 | 0.14 |
| W | 1 | 0.06 | the lines joining these points to form the limit UVW being such that:

|  | x | e/L |
|---|---|---|
| UV | (r−Ru)/(Rv−Ru) | 0.14 |
| VW | (r−Rv)/(Rw−Rv) | 0.14−0.08x | with Ru, Rv and Rw representing the respective positions of U, V and W along the blade, and an upper limit XYZ, such that the coordinates of the points X, Y and Z are as follows:

|   | r/R | e/L |
|---|---|---|
| X | 0 | 0.16 |
| Y | 0.4 | 0.16 |
| Z | 1 | 0.08 | the lines joining these points to form the limit XYZ being such that:

|   | x | e/L |
|---|---|---|
| XY | $(r-R_x)/(R_y-R_x)$ | 0.16 |
| YZ | $(r-R_y)/(R_z-R_y)$ | $0.16-0.08x$ | with $R_x$, $R_y$ and $R_z$ representing the respective positions of X, Y and Z along the blade.

10. The blade as claimed in claim 9, wherein, between the lower limit UVW and the upper limit XYZ, a preferred curve is formed by the points K, L and M whose coordinates are as follows:

|   | r/R | e/L |
|---|---|---|
| K | 0.20223 | 0.15 |
| L | 0.4 | 0.15 |
| M | 1 | 0.07 | the lines joining these points to form the limit KLM being such that:

|   | x | e/L |
|---|---|---|
| KL | $(r-R_k)/(R_l-R_k)$ | 0.15 |
| LM | $(r-R_l)/(R_m-R_k)$ | $0.15-0.08x$ | with $R_k$, $R_l$ and $R_m$ representing the respective positions of K, L and M along the blade.

* * * * *

UNITED STATES PATENT AND TRADEMARK OFFICE
CERTIFICATE OF CORRECTION

PATENT NO. : 6,000,911
DATED : December 14, 1999
INVENTOR(S) : Toulmay et al.

It is certified that error appears in the above-identified patent and that said Letters Patent is hereby corrected as shown below:

Column 18, line 22 "determines the sweep" should be -- determines a sweep --

Column 18, line 36 "the chord length" should be -- a chord length --

Signed and Sealed this

Twelfth Day of September, 2000

Attest:

Q. TODD DICKINSON

Attesting Officer

Director of Patents and Trademarks